US007421106B2

(12) United States Patent
Mori et al.

(10) Patent No.: US 7,421,106 B2
(45) Date of Patent: Sep. 2, 2008

(54) BILL DISCRIMINATING APPARATUS

(75) Inventors: Akira Mori, Owariasahi (JP); Muneharu Nakabayashi, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 11/987,707

(22) Filed: Dec. 4, 2007

(65) Prior Publication Data

US 2008/0089573 A1 Apr. 17, 2008

Related U.S. Application Data

(63) Continuation of application No. 10/999,157, filed on Nov. 30, 2004, now Pat. No. 7,319,785.

(30) Foreign Application Priority Data

Dec. 12, 2003 (JP) ............................ 2003-414602

(51) Int. Cl.
*G06K 9/00* (2006.01)

(52) U.S. Cl. ...................................... 382/135; 194/206

(58) Field of Classification Search ................. 382/135, 382/136, 137, 138, 139, 140; 194/206, 207, 194/210, 211, 212, 215, 229, 317, 350
See application file for complete search history.

(56) References Cited

U.S. PATENT DOCUMENTS

| | | | | | |
|---|---|---|---|---|---|
| 4,487,306 | A | * | 12/1984 | Nao et al. | 194/207 |
| 5,447,240 | A | * | 9/1995 | Makino | 209/576 |
| 5,678,678 | A | * | 10/1997 | Brandt et al. | 194/206 |

FOREIGN PATENT DOCUMENTS

| | | | |
|---|---|---|---|
| EP | 0 097 570 | | 1/1984 |
| EP | 0 798 670 | A2 | 10/1997 |
| JP | 63-247895 | A | 10/1988 |
| JP | 07-006245 | | 1/1995 |

* cited by examiner

*Primary Examiner*—Bhavesh Mehta
*Assistant Examiner*—Abolfazl Tabatabai
(74) *Attorney, Agent, or Firm*—McDermott Will & Emery LLP

(57) ABSTRACT

A technology that increases bill discrimination precision, wherein a bill discriminating apparatus detects the thickness distribution of a bill P that is subject to discrimination, and by comparing this thickness distribution data and the reference thickness distribution data that shows the thickness distribution of an authentic note held in advance, performs discrimination processing that includes double feed detection, tape detection, and authenticity discrimination. Then, authenticity discrimination is performed on areas for which the difference between the thickness distribution data and the reference thickness data is within a specified range.

6 Claims, 12 Drawing Sheets

BILL DISCRIMINATING APPARATUS

RELATED APPLICATIONS

This application is a Continuation of U.S. application Ser. No. 10/999,157, filed Nov. 30, 2004, now U.S. Pat. No. 7,319,785, issued Jan. 15, 2008, claiming priority of Japanese Application No. 2003-414602, filed Dec. 12, 2003, the entire contents of each of which are hereby incorporated by reference.

BACKGROUND OF THE INVENTION

This technology relates to a bill discriminating apparatus that performs bill discrimination.

PRIOR ART

Bill discriminating apparatuses for performing bill discrimination are incorporated in cash automatic teller machines (ATM) installed at financial institutions, etc. and in automatic vending machines. A variety of discrimination technologies were proposed for this bill discriminating apparatus in the past. As one of these discrimination technologies, there is a technology that discriminates bills to which a foreign object such as tape is adhered.

For example, with the bill discriminating apparatus noted in Japanese Patent Laid-Open Gazette No. 7-6245, by comparing the detection voltage in relation to the thickness of a bill type, the tape detection reference voltage, and the negotiable security detection reference voltage, a detection is made of whether or not there is tape. Then, furthermore, when tape is adhered extending to both ends of the negotiable security, a text image of two locations on the negotiable security is taken, and by comparing these, discrimination is performed for whether this is authentic or not.

Also, with the bill determination apparatus noted in Japanese Patent Laid-Open Gazette No. 63-247895, a detection signal output from a thickness sensor while the bills are being conveyed is taken, data that shows the irregularity pattern of the bill is obtained, and by comparing this with a reference pattern, a determination is made of whether the bill is authentic or not. With this technology, it is also possible to perform two sheet overlap detection (hereafter called double feed detection) that detects when two bills or more are fed overlapping each other, or to perform detection of whether there is tape on the bill (hereafter called tape detection).

SUMMARY OF THE INVENTION

However, among bills to which tape is adhered (hereafter called taped notes), there could be authentic notes which are completely torn bills that are fixed using tape, or bills that look like they will tear that have been reinforced using tape, or counterfeit notes that have been altered by sticking together part of an authentic note and part of a counterfeit note (altered note). In the past, it was not possible to discriminate these types of bills with good precision. Also, with the prior art described above, discrimination of bill authenticity was performed by whether bill thickness was within a specified range, and the precision of authenticity discrimination was improved.

This technology was created to solve the problems described above, and its purpose is to improve bill discriminating precision.

To solve at least part of the problems described above, the following structure was used. Specifically, the first bill discriminating apparatus of this technology is a bill discriminating apparatus that performs bill discrimination, comprising a storage unit that stores in advance reference thickness distribution data that shows the distribution of the thickness of authentic notes, a thickness detection unit that detects the distribution of thickness of the bill that is subject to discrimination, and a discrimination unit that performs a specified discrimination based on the reference thickness distribution data and the detected detection thickness distribution data, wherein the discrimination unit performs the bill authenticity discrimination based on the reference thickness distribution data for an area for which the absolute value of the difference between the detected thickness distribution data and the reference thickness distribution data is a specified threshold value or less, and on the detected thickness distribution data.

The reference thickness distribution data and detected thickness distribution data described above is data that shows the spatial shape of a bill. Therefore, by comparing both of these, it is possible to improve the precision of bill discrimination to be better than prior art authenticity discrimination based on whether the bill thickness is within a specified scope. If the thickness distribution data is made to be three dimensional data that shows the in-plane distribution of a bill, it is possible to further improve the bill discrimination precision. Moreover, detection of bill thickness distribution may also be performed by scanning the bill by having it contact a roller or sensing pin, etc., or by performing this without contact using light or sound waves, etc. Ink irregularities due to intaglio printing are also included in bill thickness distribution.

Authenticity discrimination is also performed for when the absolute value of the difference between the detected thickness distribution data and the reference thickness distribution data is in a range of a specified threshold value or less. This is because for areas for which the absolute value of the difference between the detected thickness distribution data and the reference thickness distribution data is greater than a specified threshold value, this can be regarded as the thickness of the bill itself being thick, as multiple bills overlapping, as the thickness of the bill itself being thin, or as an adhered item such as tape being adhered to part of the bill or as being missing. By working in this way, even if there is adherence of tape, etc. or if there are abnormalities in the dimensions or thickness, it is possible to perform discrimination by effectively using other normal range data. For example, for a bill that is an authentic note which has been reinforced using tape, it is possible to determine this to be an “authentic note.”

DESCRIPTION OF THE EMBODIMENTS

Following, we will explain embodiments of the present technology based on embodiments in the following order.

Figure 1:
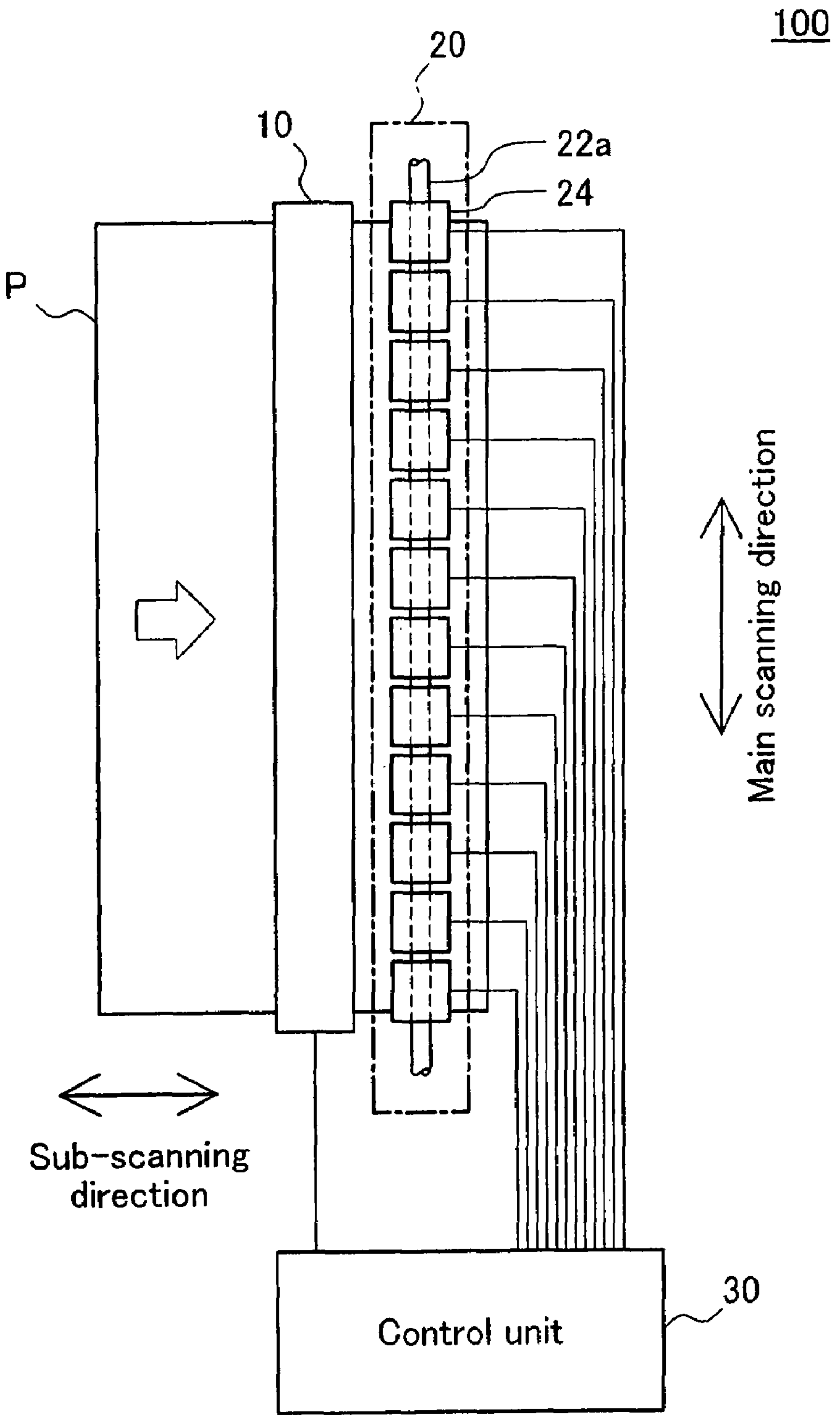
FIG. 1 shows the schematic structure of an exemplary bill discriminating apparatus.

A. Bill Discriminating Apparatus Structure:
B. Thickness Detection Mechanism:
C. Control Unit:
D. Discrimination:
E. Discrimination Process:
E1. Discrimination Process Summary:
E2. Double Feed Detection Process:
E3. Authenticity Discrimination Process:
F. Variation Examples:

A. Bill Discriminating Apparatus Structure:

FIG. 1 shows the schematic structure of the bill discrimination apparatus 100 as one embodiment of this technology. This bill discriminating apparatus 100 is incorporated in devices that handle bills such as ATMs or automatic vending machines, for example.

The bill discriminating apparatus 100 comprises an image sensor 10, a thickness detection mechanism 20, and a control unit 30. The bill discriminating apparatus 100 also comprises a conveyance mechanism that is not illustrated such as a sensor for detecting the presence of the bill P, a conveyance roller for conveying the bill P, or a guide that guides the bill P in the conveyor.

The image sensor 10 takes an image of the bill P while the bill P is being conveyed. This image is used for detection of the bill P conveyance position or for discrimination.

The thickness detection mechanism 20 detects the thickness of the bill P during conveyance in the sub-scanning direction (bill conveyance direction) that is illustrated at multiple timings across the overall bill P by twelve of the sensors 24 which are placed in the main scanning direction. With this embodiment, detection of the thickness of the bill P is performed every 0.5 mm in the sub-scanning direction, and the average value of four detections was used as one thickness data. In other words, for the sub-scanning direction, the thickness data is data for every 2 mm. Furthermore, it is also possible to detect detailed thickness data. The detected multiple thickness data are arrayed in the thickness distribution data that shows the bill P thickness distribution, and used for discrimination of the bill P.

With this embodiment, we arranged twelve of the sensors 24 on the thickness detection mechanism 20, but it is also possible to arrange even more of the sensors 24, and for the main scanning direction, to detect the thickness at a large number of points. Moreover, for convenience of illustration, for the thickness detection mechanism 20, we did not depict parts other than the sensor 24 and the rotation axis 22*a*. We will give a detailed explanation of the thickness detection mechanism 20 later.

Also, with this embodiment, as shown in FIG. 1, we made the lengthwise direction of the bill P be the main scanning direction, and the short side direction be the sub-scanning direction, but it is also possible to have the short side direction of the bill P be the main scanning direction and the lengthwise direction be the sub-scanning direction. With the former, it is possible to shorten the conveyance distance of the bill P. With the latter, it is possible to make the image sensor 10 or the thickness detection mechanism 20 smaller.

The control unit 30 controls the operation of the conveyance mechanism, the image sensor 10, or the thickness detection mechanism 20, and also executes the discrimination process of the bill P which will be described later.

Figure 2A:
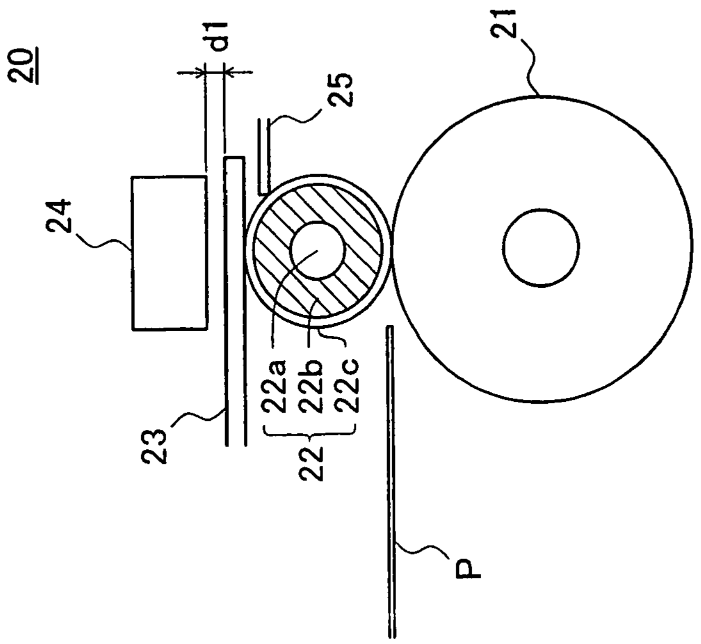
FIG. 2 shows the schematic structure of an exemplary thickness detection mechanism.
Figure 2B:
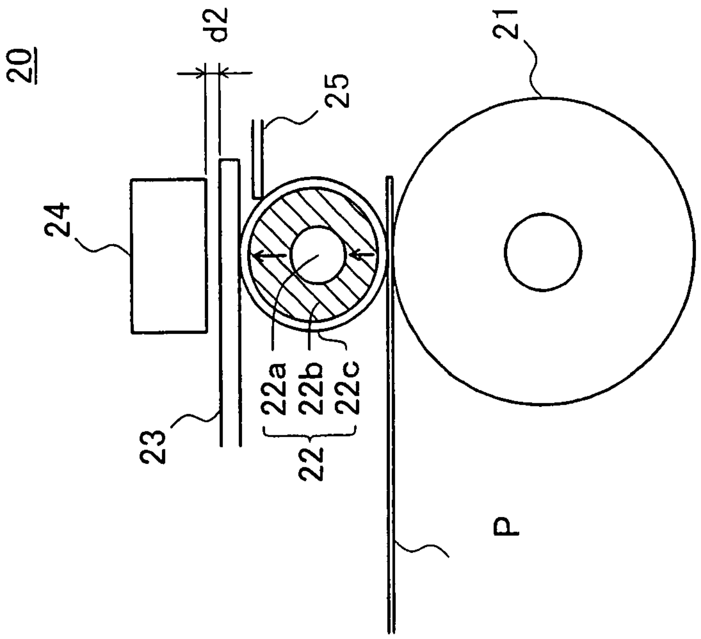

B. Thickness Detection Mechanism:

FIG. 2 shows the schematic structure of the thickness detection mechanism 20. It shows the appearance of the thickness detection mechanism when seen from the side (main scanning direction). FIG. 2(*a*) shows the state of the thickness detection mechanism 20 before it detects the thickness of the bill P. FIG. 2(*b*) shows the state of the thickness detection mechanism 20 when it is detecting the thickness of the bill P.

The thickness detection mechanism 20 comprises one reference roller 21, twelve detection rollers 22, twelve plate springs 23 that are paired with each detection roller 22, and twelve sensors 24.

The reference roller 21 is a roller for deciding the reference position in the thickness direction for the thickness detection of the bill P, and is fixed in relation to the thickness detection mechanism 20. The reference roller 21 is driven by a motor that is not illustrated, and also functions as a conveying roller for conveying the bill P.

The detection roller 22 is arranged so that its surface is in contact with the surface of the reference roller 21. This detection roller 22 is formed from a rotation axis 22*a*, an elastic body 22*b* that is provided around its periphery, and a cylindrical shaped roller unit 22*c* that is further provided around the periphery. The rotation axis 22*a* is common to twelve detection rollers 22, and is fixed to the thickness detection mechanism 20. By using this kind of structure, as shown in FIG. 2(*b*), during detection of the thickness of the bill P, when the bill P is sandwiched between the reference roller 21 and the detection roller 22, the elastic body 22*b* is deformed, and the position of the roller unit 22*c* is displaced by the amount of the thickness of the bill P. Provided on the detection roller 22 is a scraper 25 for removing paper powder that adheres to the surface of the roller unit 22*c* during rotation of the detection roller 22.

The plate spring 23 is placed so as to be in contact with the surface of the detection roller 22. The sensor 24 is placed in a position that is separated from the plate spring 23 by a distance d=d1. With this embodiment, we used an electrostatic capacity type sensor for the sensor 24. As shown in FIG. 2(*b*), during detection of the thickness of the bill P, the position of the roller unit 22*c* is displaced, the plate spring 23 is deformed, and the distance d between the sensor 24 and plate spring 23 becomes d=d2. By detecting the change in the electrostatic capacity of the gap between the sensor 24 and the plate spring 23, the sensor 24 is able to detect changes in the distance d between the sensor 24 and the plate spring 23, and to detect the thickness of the bill P.

With this embodiment, we used an electrostatic capacity type sensor for the thickness detection mechanism 20, but instead of this, it is also possible to use another sensor that is capable of detecting changes in distance d, such as an eddy current type sensor or a piezoelectric type sensor, etc.

Figure 3:
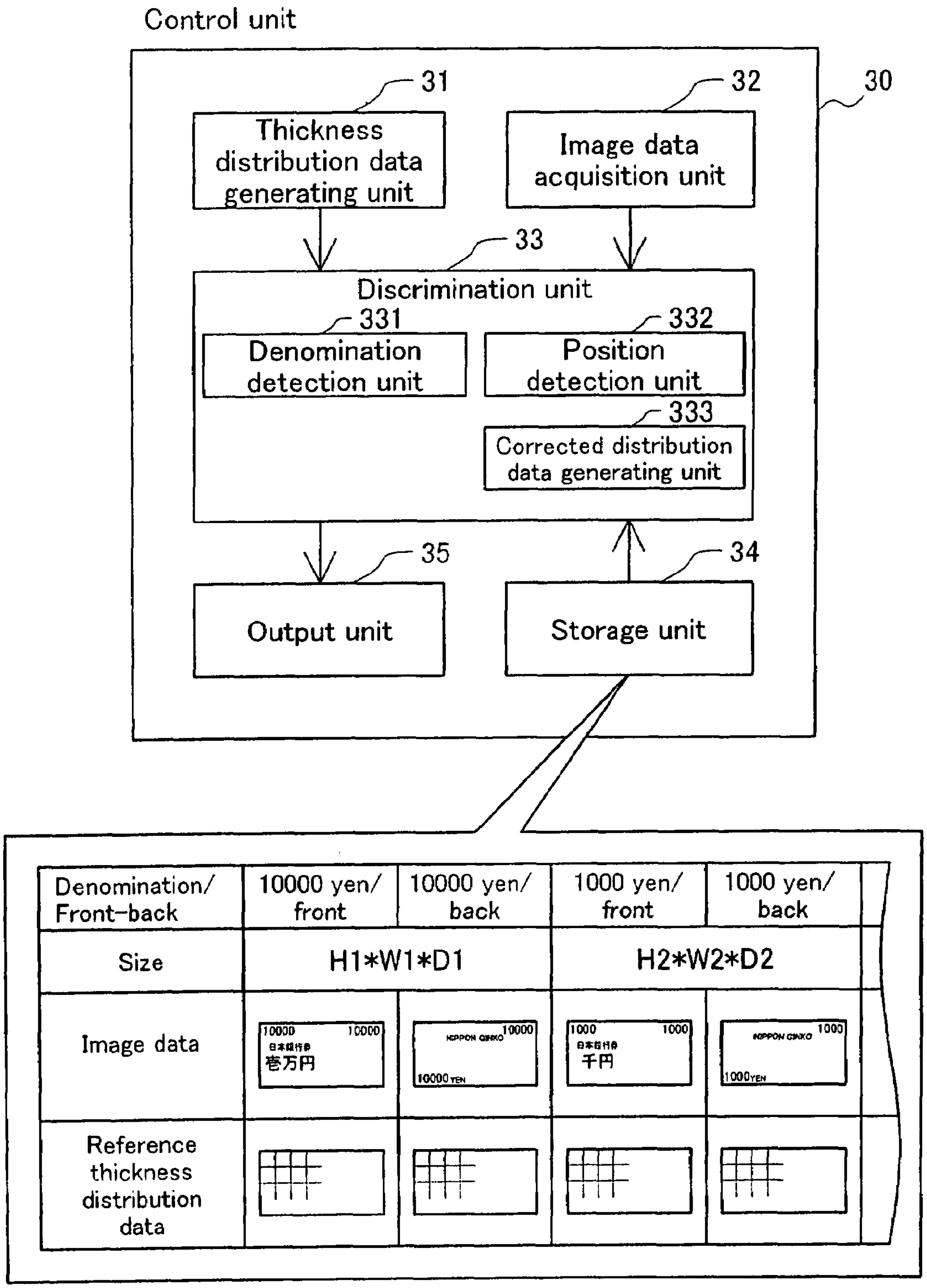
FIG. 3 shows the structure of an exemplary control unit.

C. Control Unit:

FIG. 3 shows the structure of the control unit 30. The control unit 30 is a CPU or a microcomputer comprising memory, etc. This control unit 30 comprises each of the function blocks shown in FIG. 3. With this embodiment, we formed these function blocks using software, but it is also possible to form them using hardware.

The thickness distribution data generating unit 31 gets the bill P thickness data detected by the thickness detection mechanism 20, arrays these, and generates thickness distribution data. The image data acquisition unit 32 gets an image of the bill P that, is taken by the image sensor 10.

The discrimination unit 33 comprises a denomination detection unit 31, a position detection unit 332, and a corrected distribution data generating unit 333, and performs discrimination of the bill P. By comparing the image data acquired by the image data acquisition unit 32 and the data that is stored inside the storage unit 34 to be described later, the denomination detection unit 331 detects the denomination of the bill P. The position detection unit 332 detects the conveyance position of the bill P based on the image data acquired by the image data acquisition unit 32. The conveyance position of the bill P is characterized by four parameters as will be described later, specifically, back and front, conveyance direction, shift volume, and skew angle. The corrected distribution data generating unit 333, of the parameters characterized by the position detection unit 332, based on the conveyance direction, shift volume, and skew angle, in order to compare with the reference thickness distribution data stored in the storage unit 34, corrects the thickness distribution data so as to correct the skew of both, and generates corrected distribution data. By working in this way, even if the position of the bill that is subject to discrimination is skewed from the reference, it is possible to perform discrimination processing with good precision.

The storage unit 34 stores various types of data related to authentic notes for the discrimination unit 33 to reference during discrimination of the bill P. The contents of these data are shown in typical form in FIG. 3. Specifically, the storage unit 34 stores authentic note image data as well as reference thickness distribution data which is three dimensional in-plan distribution data of the authentic note thickness for each denomination as well as front and back. The storage unit 34 also stores the authentic note size for each denomination. This size includes dimensions and thickness. By handling in this way, it is possible to perform discrimination processing that handles multiple denominations and bill front and backs.

Moreover, with this embodiment, we had the storage unit 34 store reference thickness distribution data for each front and back for one denomination, but it is also possible to have it store one reference thickness distribution data that includes the front and back thickness distribution. The storage unit 34 may also be set to store reference thickness distribution data to match the detection mode of the thickness detection mechanism 20. The output unit 35 outputs the discrimination results of the discrimination unit 33 to the outside.

Figure 4:
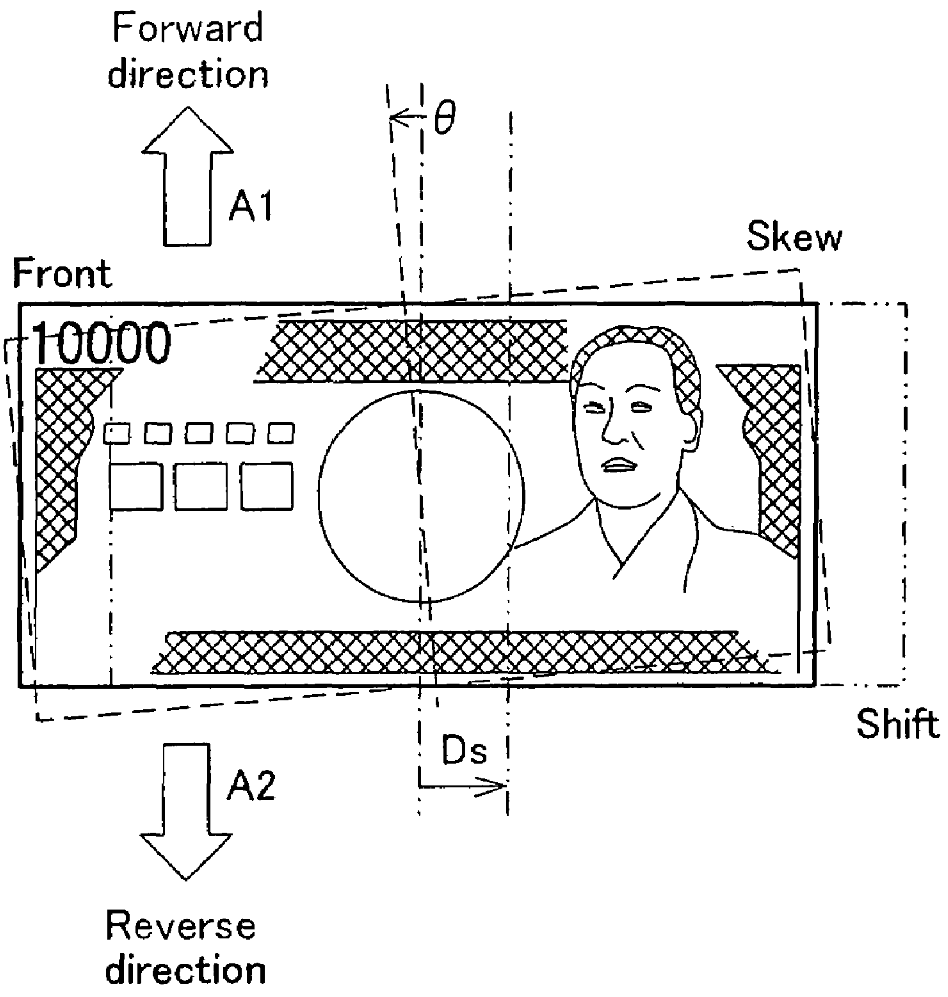
FIG. 4 shows an exemplary bill conveyance position.

FIG. 4 shows the bill conveyance position. With this embodiment, the bill conveyance position is characterized by four parameters. The first parameter is the front and back of the bill. In FIG. 4, an example of the front state is shown. The second parameter is the conveyance direction. There is the forward direction and the reverse direction. With this embodiment, the direction of arrow A1 in FIG. 4 is defined as the forward direction, and the direction of arrow A2 is defined as the reverse direction. Even when the bill is the reverse side, it is possible to define the forward direction and reverse direction. The third parameter is the shift volume. As shown by the double-dot dashed line in FIG. 4, shift means the state of the center of the bill being displaced from the center of the conveyance mechanism. The displacement volume Ds at this time is the shift volume. With this embodiment, the displacement volume to the orthogonal right toward the conveyance direction is defined as the shift volume. The fourth parameter is the skew angle. As shown by the dashed line in FIG. 4, skew means the state of the left-right symmetrical axis of the bill being inclined from the conveyance direction. The angle of inclination θ at this time is the skew angle. With this embodiment, the counterclockwise rotation direction from the conveyance direction is defined as the correct skew angle.

Moreover, the conveyance positions explained here are nothing more than examples, and this is not limited to these. It is also possible to define the conveyance position using even more parameters. It is also possible to omit part of the parameters described above. Also, with this embodiment, the conveyance position described above was characterized by the image processing of the bill P, but it is also possible to separately provide a sensor for detecting the conveyance position.

D. Discrimination:

The bill discriminating apparatus 100 of this embodiment may perform three types of discrimination: double feed detection, tape detection, and authenticity discrimination.

Figure 5A:
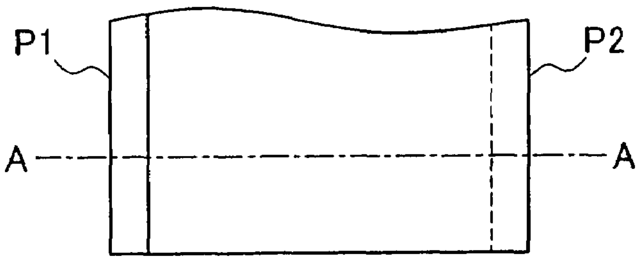
FIG. 5 shows an example of a summary of double feed detection.
Figure 5B:
Figure 5C:
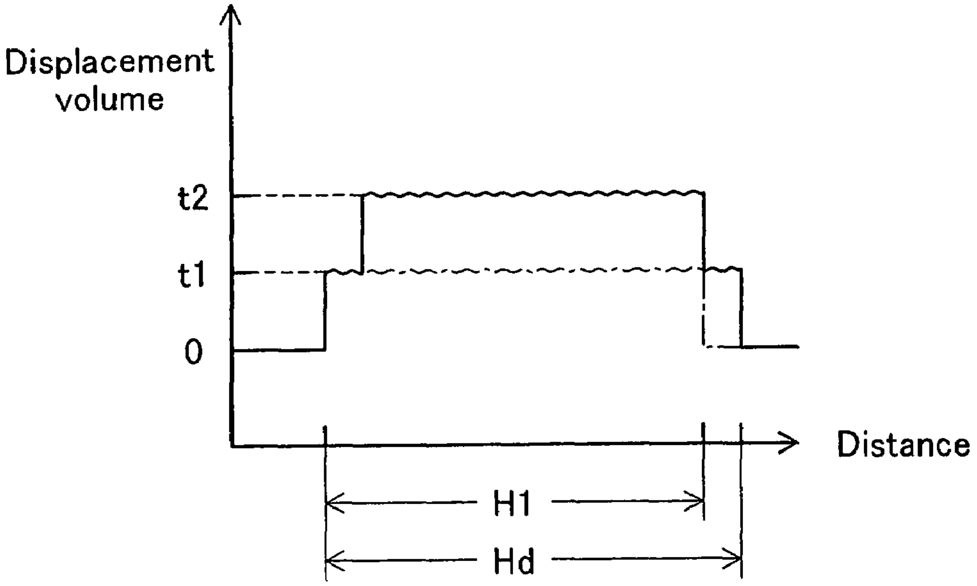

FIG. 5 shows an example of a summary of double feed detection. FIG. 5(*a*) is a plan view that shows the state of a bill P1 and a bill P2 being displaced and overlapping in the short side direction. FIG. 5(*b*) is a cross section diagram of A-A in FIG. 5(*a*). FIG. 5(*c*) shows the thickness data profile for cross section A-A of FIG. 5(*a*). In FIG. 5(*c*), t1 shows the thickness of an authentic note and of the bills P1 and P2. t2 is double t1. H1 shows the short side direction length of an authentic note and of the bills P1 and P2. As shown in FIG. 5(*c*), when the two bills P1 and P2 are displaced and overlapped in the short side direction, for the thickness data profile of the bill that is subject to discrimination, the thickness has an area that is twice the authentic note thickness t1, and the thickness detection distance Hd is longer than the authentic note short side direction length H1.

In this way, when there is an area for which the thickness is an integral multiple of the authentic note thickness, and the dimensions are greater than the dimensions of an authentic note, it is possible to detect that there is double feed. For example, since it is also possible to have a case with double feed of a bill (counterfeit note) for which the thickness is different from that of an authentic note, regardless of whether or not there is an area for which the thickness is an integral multiple of the thickness of an authentic note, when the dimensions are greater than the dimensions of an authentic note, it is also possible to have this case judged as double feed. Moreover, here, for convenience of explanation, we explained a summary of double feed detection based on the thickness data in the A-A cross section of FIG. 5(*a*), but with the bill discriminating apparatus 100, a judgment of double feed detection is performed based on the thickness distribution of the overall bill.

Figure 6A:
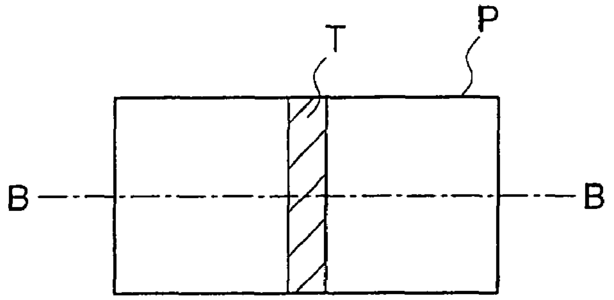
FIG. 6 shows an example of a summary of tape detection.
Figure 6B:
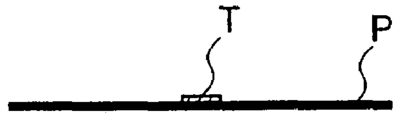
Figure 6C:
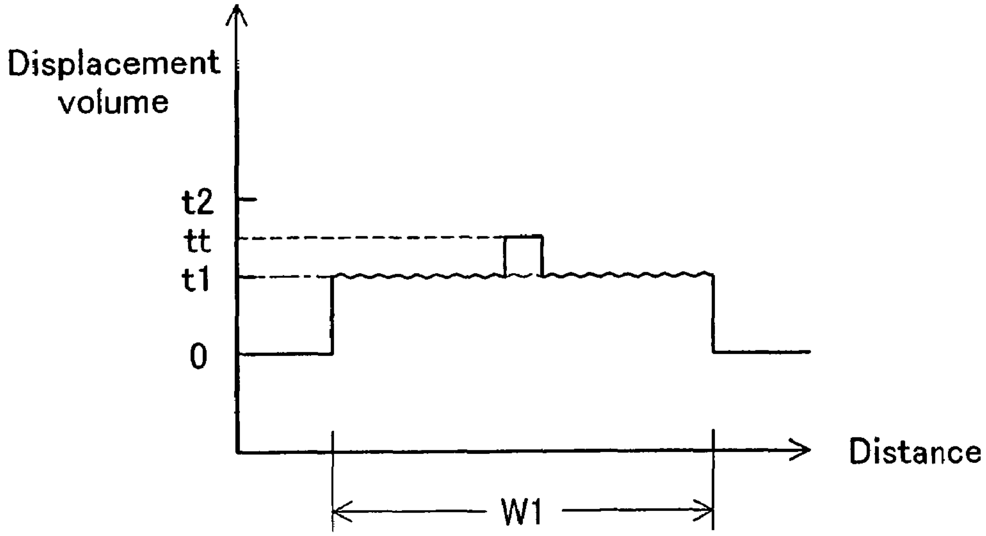
Figure 7A:
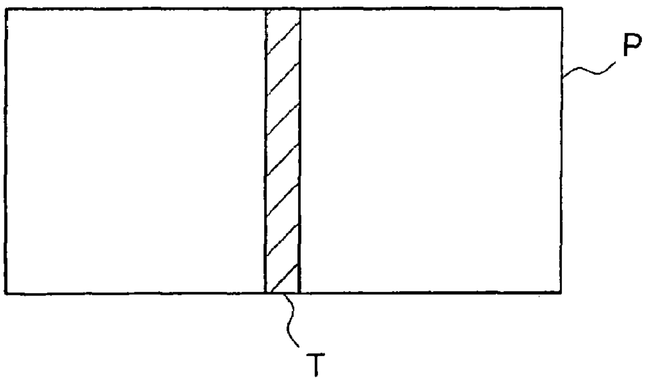
FIG. 7 shows a summary of authenticity discrimination.
Figure 7B:
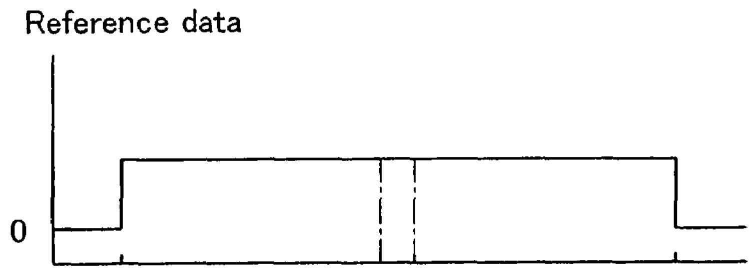
Figure 7C:
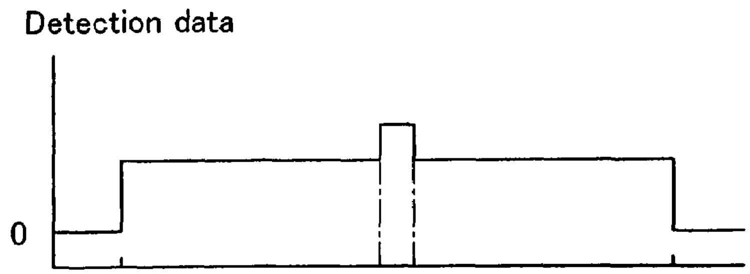
Figure 7D:
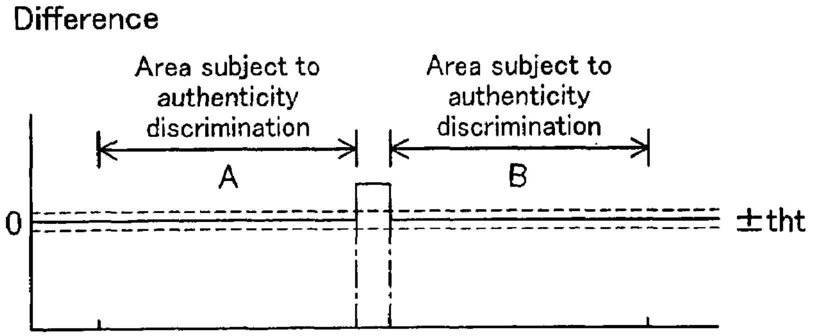

FIG. 6 shows an example of a summary of tape detection. FIG. 6(*a*) is a plan view that shows the state when a tape T is adhered to a bill P. FIG. 6(*b*) is a cross section diagram of B-B of FIG. 6(*a*). FIG. 6(*c*) shows the thickness data profile for the cross section B-B of FIG. 6(*a*). In FIG. 6(*c*), W1 shows the length of the lengthwise direction of an authentic note and the bill P. tt is greater than t1 and smaller than t2. With the example in FIG. 6, tt−t1 correlates to the thickness of the tape T.

In this way, when there is an area for which the thickness is different from an integral multiple of the thickness of an authentic note, and there is an area for which the thickness is authentic note thickness t1, it is possible to judge that this is a taped note. Moreover, here, for convenience of explanation, we explained a summary of tape detection based on the thickness data for the cross section B-B of FIG. 6(*a*), but with the bill discriminating apparatus 100, judgment of tape detection is performed based on the thickness distribution of the overall bill. Therefore, when the outline shape of the area for which the bill thickness was detected is different from the outline shape of an authentic note, it is possible to judge that the bill is missing. Also, when there is a flat state with no unevenness across the entire detection area for the bill P thickness data, it is possible to judge that tape is adhered to the entire surface of the bill P.

FIG. 7 shows a summary of authenticity discrimination. An example is shown for the authenticity discrimination of a taped note for which tape is adhered to part of the bill. FIG. 7(*a*) is a plan view of a bill P for which the tape T is adhered. FIG. 7(*b*) shows the thickness profile of an authentic note. This is data that correlates to the reference thickness distribution data that is stored in the storage unit 34. FIG. 7(*c*) shows a profile of the detection data of the thickness of the bill P. This is data that correlates to the correction thickness distribution data generated by the corrected distribution data generating unit 333. FIG. 7(*d*) shows the difference between the detected data and the reference data. In FIG. 7(*d*), ±tht is a threshold value relating to the thickness for detecting whether or not there is a tape T, and this is set considering the thickness of the tape T. This value can be set freely according to the thickness of the tape T to be detected.

When a tape T is not adhered to the bill P, as shown by the areas A and B shown in FIG. 7(*d*), the difference between the detected data and the reference data fits within a specified range (0±tht). Meanwhile, when a tape T is adhered to the bill P, as shown in FIG. 7(*d*), there is an area that is outside of the specified scope. Also, for example, when the data of area B in FIG. 7(*d*) is outside of 0±tht, it is possible to judge that this is an altered note for which a tape T is adhered to a bill of a different thickness.

With the authenticity discrimination of this embodiment, the area for which the difference between the detected data and the reference data is within a specified range (areas A and B) is stipulated as the area subject to authenticity discrimination. Then, for this area subject to authenticity discrimination, based on the reference data and the detected data, a detailed authenticity discrimination is performed for whether or not the difference between these data is within a specified reference range. The reference range can be set freely considering the bill wearing, etc. By performing authenticity discrimination in this way, regardless of whether or not the bill subject to discrimination is a taped note or not, it is possible to perform authenticity discrimination.

E. Discrimination Process:

E1. Discrimination Process Summary:

The bill discriminating apparatus 100 of this embodiment classifies bills subject to discrimination as authentic notes for which the dimensions and thickness distribution are correct, counterfeit notes for which the dimensions are abnormal, counterfeit notes for which the thickness distribution is abnormal, authentic notes to which tape is adhered, or counterfeit notes to which tape is adhered using the discrimination process shown hereafter.

Figure 8:
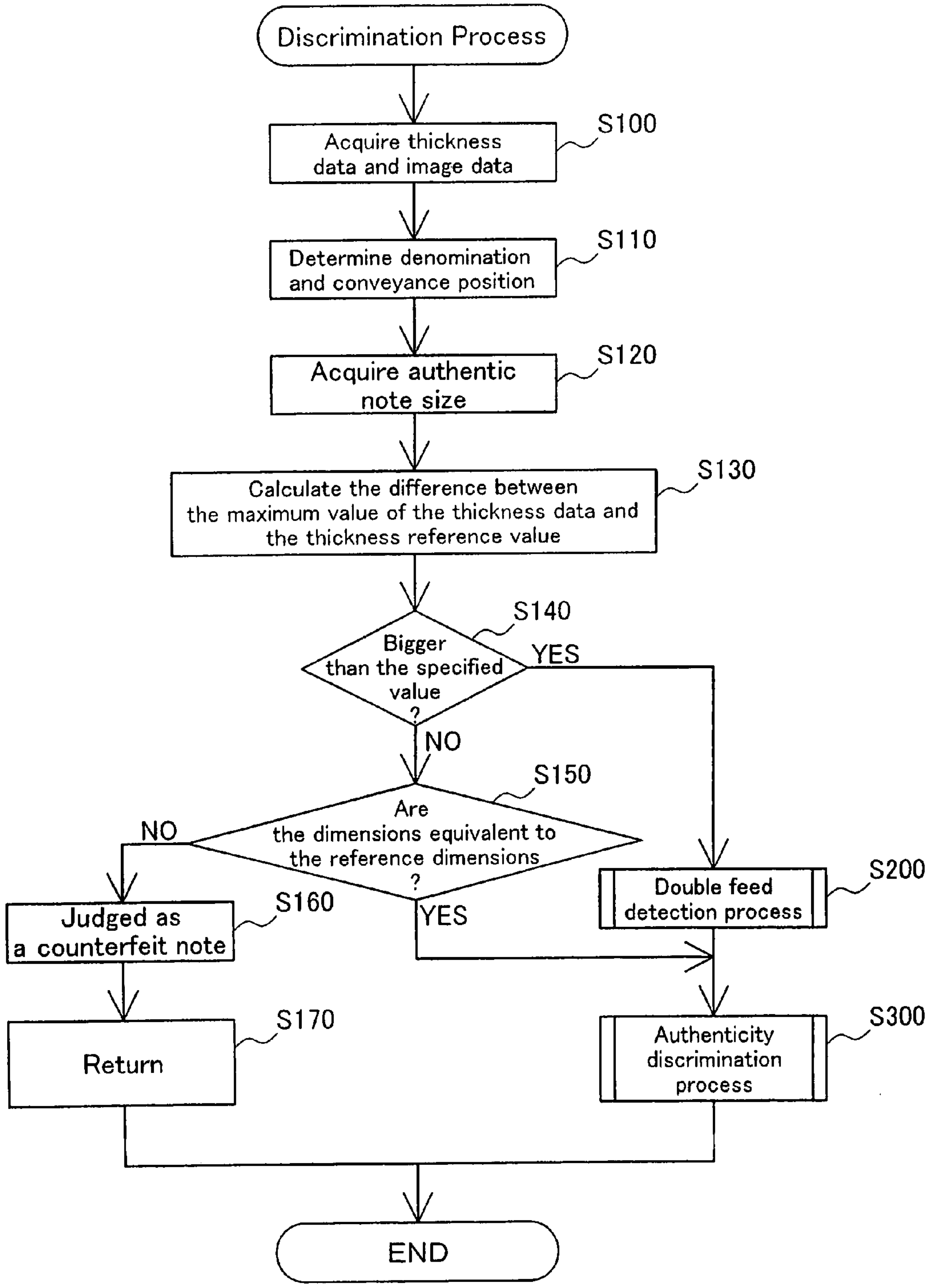
FIG. 8 is a flow chart that shows the bill conveyance position.

FIG. 8 is a flow chart that shows the flow of the discrimination process. This is the process that is executed by the control unit 30. First, the thickness data detected by the thickness detection mechanism 20 and the image data taken by the image sensor 10 are acquired (step S100). Then, referencing the storage unit 34, based on the acquired image data, a judgment is made of the bill denomination and the conveyance position (step silo).

Next, the bill size that corresponds to the denomination determined in step S110 is acquired from the storage unit 34 (step S120). This size includes the authentic note dimensions and thickness. Hereafter, these will be called the dimension reference value and the thickness reference value. Then, the difference between the maximum value of the bill thickness data and the thickness reference value, in other words, (maximum value of the bill thickness data)−(thickness reference value) is calculated (step S130), and a judgment is made of whether or not this value is greater than a specified value (step S140).

In step S140, when the difference between the maximum value of the bill thickness data and the thickness reference value is greater than the specified value, the double feed detection process (step S200) described later is executed, and after that, the authenticity discrimination process (step S300) is executed.

In step S140, when the difference between the maximum value of the bill thickness data and the thickness reference value is less than the specified value, a judgment is made of whether or not the bill dimensions are equivalent to the dimensions reference value (step S150). When the bill dimensions are equivalent to the dimensions reference value, the authenticity discrimination process (step S300) is executed. Meanwhile, when the bill dimensions and the dimension reference value are not equivalent, this is judged to be a counterfeit note (step S160), and the bill is returned (step S170). At this time, instead of returning, it is also possible to withdraw the bill that is judged to be a counterfeit note. This is the same for the process noted below as well.

Figure 9:
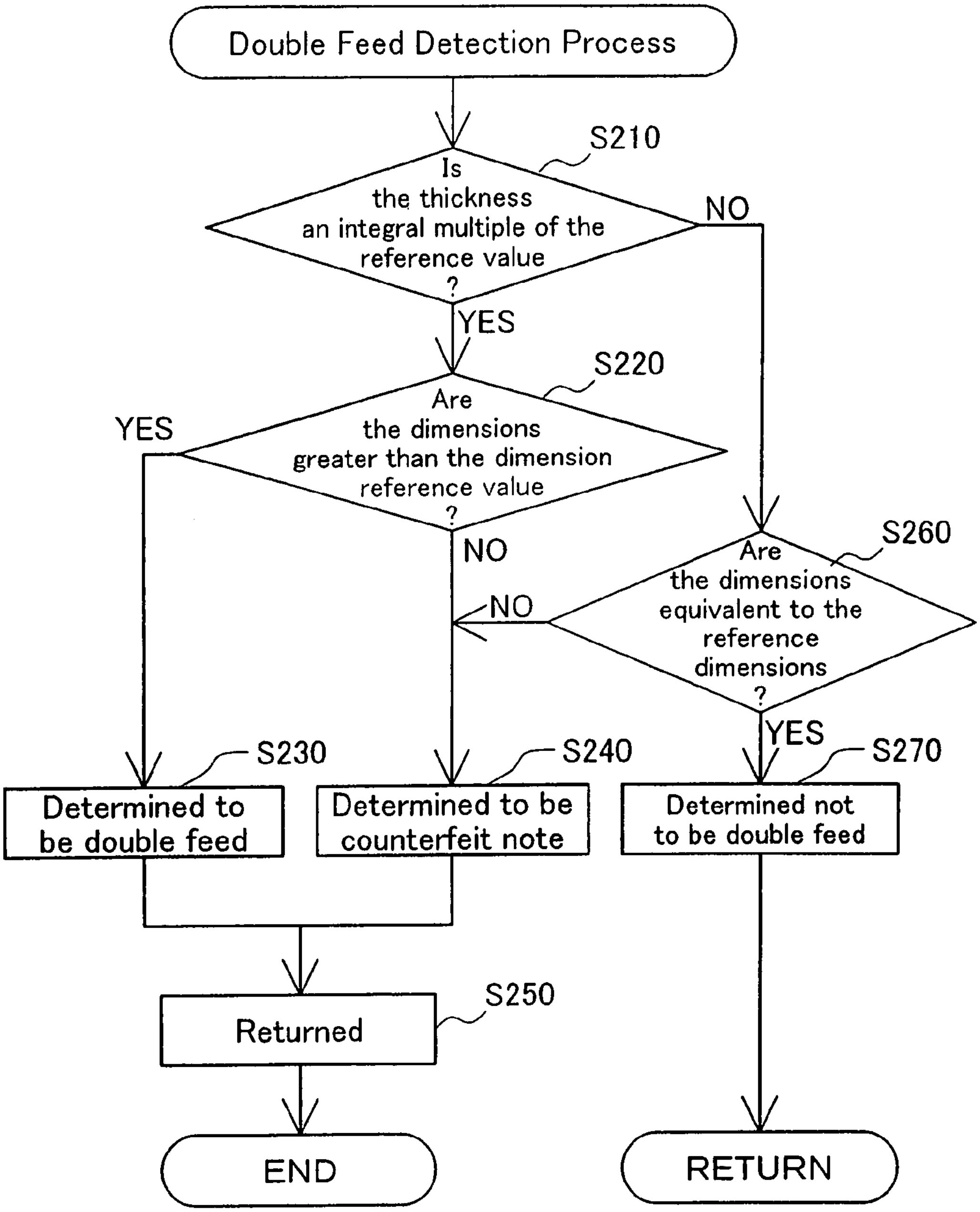
FIG. 9 is a flow chart that shows the flow of the double feed detection process.

E2. Double Feed Detection Process:

FIG. 9 is a flow chart that shows the flow of the double feed detection process of step S200 of FIG. 8. This double feed detection process is a process that is executed for bills for which, in step S140 of FIG. 8, the difference between the maximum value of the bill thickness data and the thickness reference value is greater than the specified value.

First, a judgment is made of whether or not the maximum value of the bill thickness data is an integral multiple of the thickness reference value (step S210). If the maximum value of the bill thickness data is an integral multiple of the thickness reference value, a judgment is made of whether or not the bill dimensions are greater than the dimension reference value (step S220). Then, if the bill dimensions are greater than the dimension reference value, this is judged as being double feed (step S230), and the bills are returned (step S250). Note that either of the processes of step S210 and step S220 can be omitted.

In step S220, if the bill dimensions are less than the dimension reference value, a judgment is made that this is a counterfeit note (step S240), and the bill is returned (step S250). Note that when a bill is returned, the process does not advance to the authenticity discrimination process (step S300) of FIG. 8, and discrimination processing ends.

In step S210, when the maximum value of the bill thickness data is not an integral multiple of the thickness reference value, a judgment is made of whether or not the bill dimensions are equivalent to the dimension reference value (step S260). When the bill dimensions are equivalent to the dimension reference value, this is judged as not being double feed (step S270), and a return is done. When the bill dimensions and the dimension reference value are not equivalent, this is judged as a counterfeit note (step S240), and the bill is returned (step S250).

Figure 10:
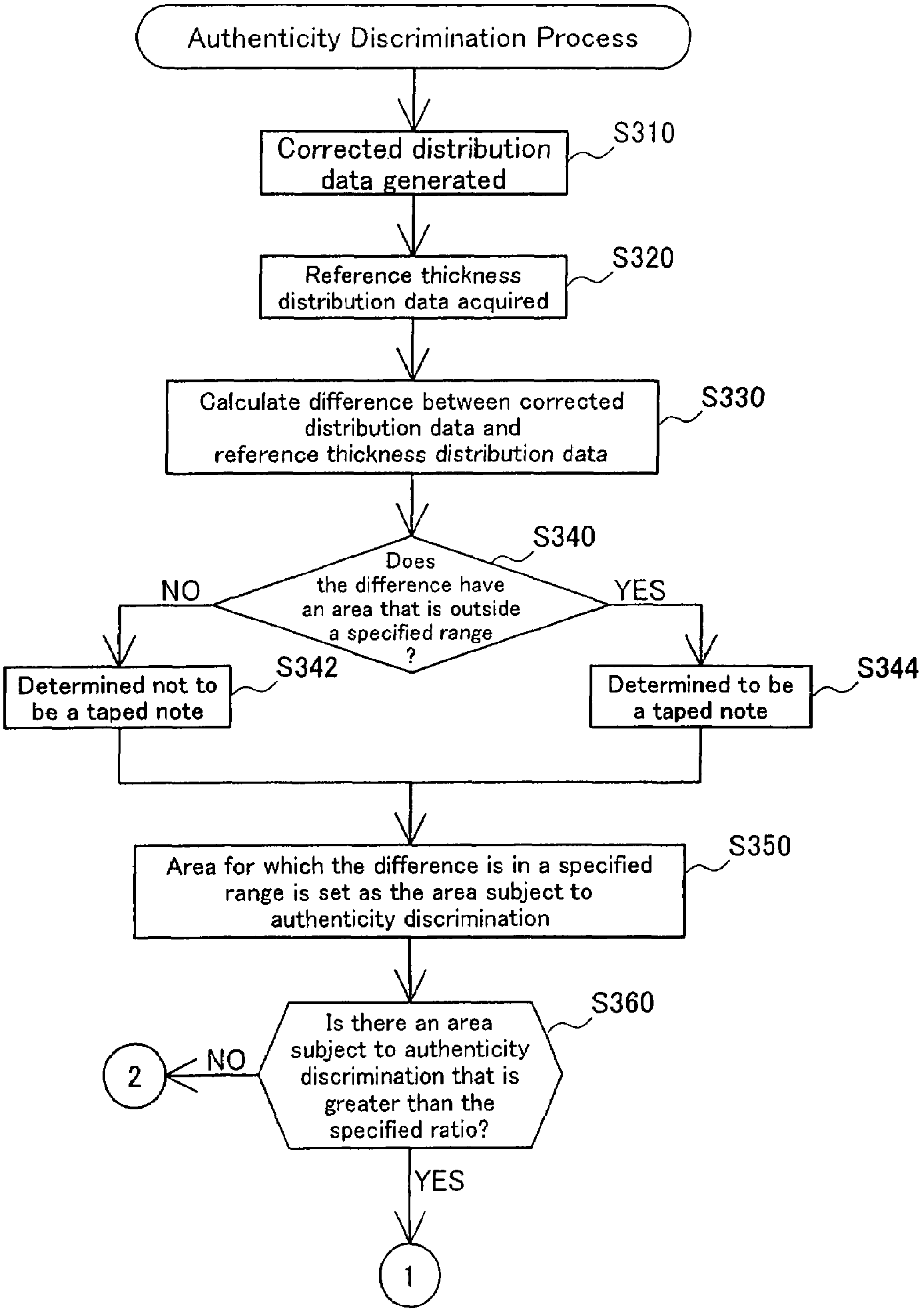
FIG. 10 is a flow chart that shows the flow of the authenticity discrimination process.
Figure 11:
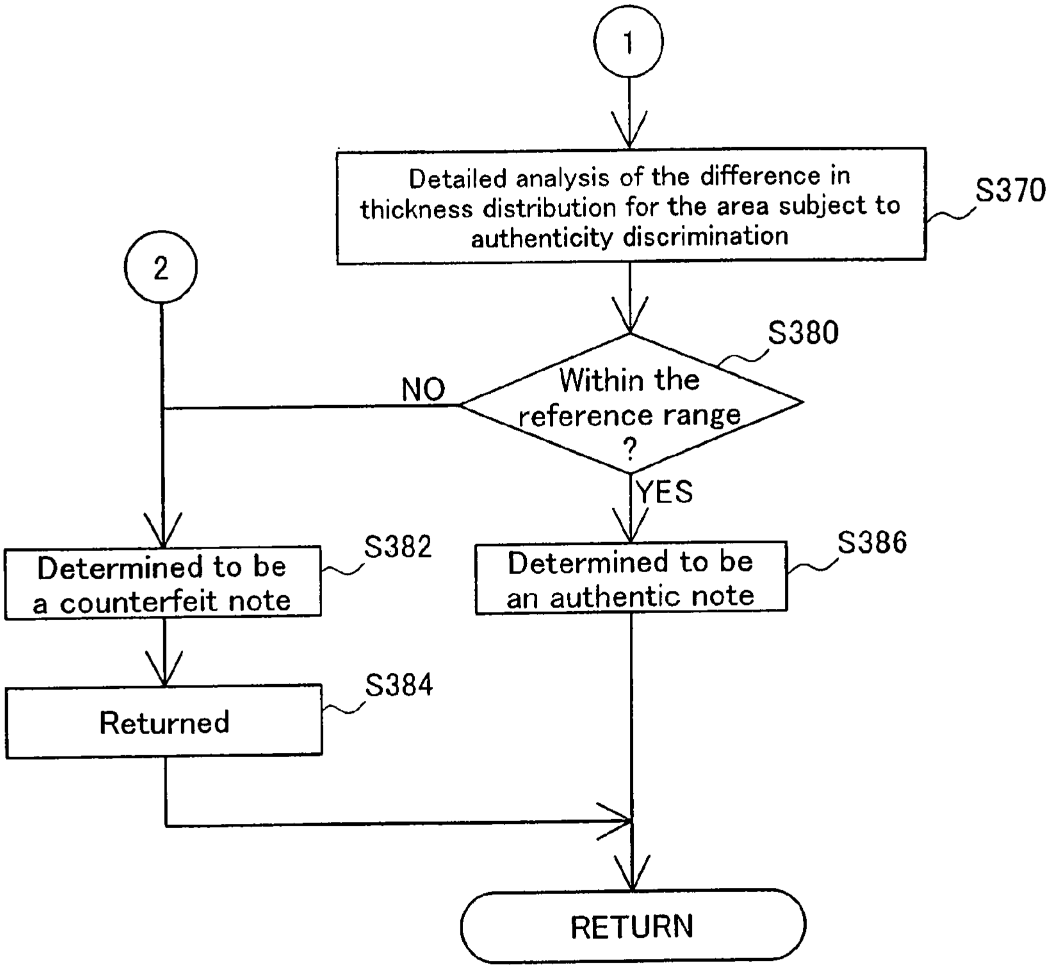
FIG. 11 is a flow chart that shows the flow of the authenticity discrimination process.

E3. Authenticity Discrimination Process:

FIGS. 10 and 11 are flow charts that show the flow of the authenticity discrimination process for step S300 of FIG. 8. This authenticity discrimination process is a process that is executed for bills for which the dimensions are equivalent to the dimension reference value.

First, based on the conveyance position that was judged with step S110 of FIG. 8, corrected distribution data is generated by the corrected distribution data generating unit 333 (step S310). Then, reference thickness distribution data that corresponds to the denomination determined in step S110 of FIG. 8 and to the front and back of the bill is acquired from the storage unit 34 (step S320).

Next, for the entire area of the bill, the difference between the corrected distribution data and the reference thickness distribution data, in other words, (corrected distribution data)−(reference thickness distribution data) is calculated (step S330). Then, the same as shown in FIG. 7(*d*), a judgment is made of whether or not the difference between the corrected distribution data and the reference thickness distribution data has an area that is outside a specified range (0±tht) (step S340). When the difference between the corrected distribution data and the reference thickness distribution data does not have an area that is outside a specified range, a judgment is made that this is not a taped note (step S342). When the difference between the corrected distribution data and the reference thickness distribution data does have an area that is outside a specified range, a judgment is made that this is a taped note (step S344).

Next, the difference between the corrected distribution data and the reference thickness distribution data sets the area that is inside the specified range as the area subject to authenticity discrimination (step S350). Then, a judgment is made of whether or not the area subject to authenticity discrimination exists at greater than a specified ratio (step S360). With this embodiment, it was set so that a judgment is made of whether or, not the area subject to authenticity discrimination exists at 67% or greater.

In step S360, when the area subject to authenticity discrimination is not at greater than a specified ratio, this is judged as a counterfeit note (step S382), and the bill is returned (step S384). By working in this way, it is possible to ensure the precision of the authenticity discrimination. When the area subject to authenticity discrimination is at greater than the specified ratio, for the area subject to authenticity discrimination, a detailed analysis is done of the difference in the thickness distribution including ink irregularities due to intaglio printing (step S370), and a judgment is made of whether or not the analysis results are within a specified reference range. The reference range cane be set freely taking into consideration bill wearing, etc. Note that with this embodiment, the authenticity discrimination is performed based on the difference between the corrected distribution data and the reference distribution data, but it is also possible to perform authenticity discrimination based on the absolute value of the difference of both items.

In step S380, when the analysis results are within the reference range, this is judged as being an authentic note (step S386). When the analysis results are outside the reference range such as when the thickness of the bill itself is thick or thin, or the unevenness state of the bill surface is different from the unevenness state of the authentic note, etc., this is judged as being a counterfeit note (step S382), and the bill is returned (step S394).

Using the discrimination process described above, it is possible to classify the bills subject to discrimination into authentic notes for which the dimensions and thickness distribution is correct, counterfeit notes for which the dimensions are abnormal, counterfeit notes for which the thickness distribution is abnormal, authentic notes to which tape is adhered, and counterfeit to which tape is adhered.

With the bill discriminating apparatus 100 of this embodiment noted above, authenticity discrimination is performed based on reference thickness distribution data which is three dimensional data that shows the spatial shape of a bill and on corrected distribution data, so this allows for an improvement in the precision of bill discrimination compared to the prior art authenticity discrimination based on whether or not the bill thickness is within a specified range.

Also, the bill discriminating apparatus 100 of this embodiment performs authenticity discrimination for areas subject to authenticity discrimination for which the difference between the correction thickness distribution data and the reference thickness distribution data is within a specified range, so even in cases when there are abnormalities in the dimensions or size such as when there is tape adhered, it is possible to perform discrimination by effectively using other correct area data. Furthermore, when the thickness of the bill subject to discrimination is greater than the thickness of an authentic note, regardless of whether or not that bill is an authentic note, it is possible to perform double feed detection and tape detection. Therefore, it is possible to improve the precision of bill discrimination.

F. VARIATION EXAMPLES

As noted above, this embodiment may be implemented in various forms that are in a range that do not stray from the gist of this embodiment. The following variation examples are possible, for example.

Figure 12A:
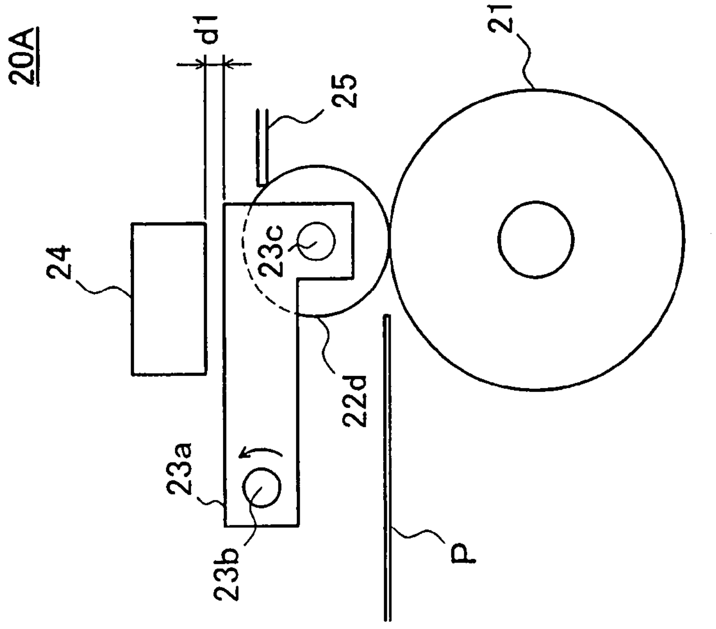
FIG. 12 shows the schematic structure of a thickness detection mechanism as a variation example.
Figure 12B:
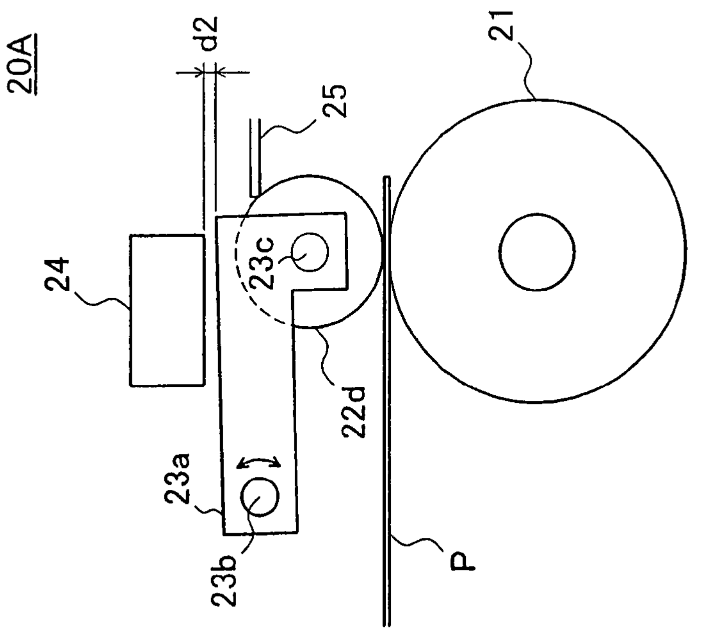

F1. Variation Example 1:

FIG. 12 shows the schematic structure of a thickness detection mechanism 20A as a variation example. The same as the thickness detection mechanism 20 shown in FIG. 2, the thickness detection mechanism 20A shows the state seen from the side (main scanning direction).

The thickness detection mechanism 20A comprises a detection roller 22*d* and an arm 23*a* of this detection roller 22*d* in place of the detection roller 22 and plate spring 23 that form the thickness detection mechanism 20. Then, the detection roller 22*d* is supported on the arm 23*a* by the axis 3*c*, and the arm 23*a* is supported on the thickness detection mechanism 20A by the axis 23*b*. The axis 23*b* is common to twelve arms 23*a*. The structure other than this is the same as for the thickness detection mechanism 20.

By detecting changes in the electrostatic capacity of the gap between the sensor 24 and the arm 23*a*, the sensor 24 is able to detect changes in the distance d between the sensor 24 and the plate spring 23.

With the thickness detection mechanism 20A explained above as well, like with the thickness detection mechanism 20 shown in FIG. 2, it is possible to detect bill thickness.

F2. Variation Example 2:

With the aforementioned embodiments and the variation example, bill thickness detection was performed by having the detection roller contact the bill and scanning, but the technology is not limited to this. For example, it is also possible to perform bill thickness detection by scanning a sensing pin. It is also possible to perform this without any contact using light (transmitted light, reflected light) or sound waves, etc.

F3. Variation Example 3:

With the aforementioned embodiment, the threshold value tht shown in FIG. 7 is set so that it may be set freely according to the thickness of the tape T. It is also possible to have the discrimination unit 33 equipped with a threshold value setting unit for automatically setting the threshold value tht. This threshold setting unit could, for example, be made so as to set the threshold value tht based on statistical analysis of, for example, detected thickness distribution data, or of the difference between the detected thickness distribution data and the reference thickness distribution data (e.g. maximum value, minimum value, average value, variance, deviation, etc.). By working in this way, it is possible to further improve the discrimination precision.

F4. Variation Example 4:

With the aforementioned embodiments, the corrected distribution data generating unit 333 was made to correct thickness distribution data based on the conveyance position, but the technology is not limited to this. It is also possible to have correction performed so as to compensate the displacement of both items for at least one of the thickness distribution data and the reference thickness distribution data.

This application claims the benefit of priority of Japanese Application No. 2003-414602 filed Dec. 12, 2003, the disclosure of which also is entirely incorporated herein by reference.

What is claimed is:

1. A bill discriminating apparatus that performs bill discrimination, comprising:

a storage unit that stores in advance a thickness reference value of an authentic note and a dimension reference value of an authentic note;

a thickness detection unit that detects the thickness of a bill that is subject to discrimination;

a dimension detection unit that detects the dimensions of the bill that is subject to discrimination; and a discrimination unit that makes a judgment of whether or not the difference between the detected thickness and the stored thickness reference value of an authentic note is greater than a specified value, wherein when the difference between the detected thickness and the stored thickness reference value of an authentic note is greater than a specified value, the discrimination unit:

performs discrimination of the bill when the detected dimensions are equal to the dimension reference value of an authentic note; and judges the bill as a counterfeit note when the detected dimensions are not equal to the dimension reference value of an authentic note.

2. The bill discriminating apparatus in accordance with claim 1, wherein:

the storage unit stores reference thickness distribution data of an authentic note, and the discrimination unit:

acquires image data of the bill that is subject to discrimination;

generates corrected distribution data of the bill based on the image data;

makes a judgment of whether or not the difference between the corrected distribution data and the stored reference thickness distribution data has an area that is outside a specified range; and judges that an adherence item is adhered to the bill when the judgment results in an area that is outside a specified range.

3. A bill discriminating apparatus that performs bill discrimination, comprising:

a storage unit that stores in advance a thickness reference value of an authentic note and a dimension reference value of an authentic note;

a thickness detection unit that detects the thickness of a bill that is subject to discrimination;

a dimension detection unit that detects the dimensions of the bill that is subject to discrimination; and a discrimination unit that decides that there are multiple bills overlapping, when there is an area that the detected thickness is greater than the thickness reference value and the detected thickness of the area is an integral multiple of the thickness reference value and the detected dimensions are not less than the dimension reference value.

4. The bill discriminating apparatus in accordance with claim 3, further comprising:

a denomination detection unit that detects the denomination of the bill that is subject to discrimination, wherein:

the storage unit stores the reference value for each denomination, and the discrimination unit performs the discrimination using the reference value that corresponds to the detected denomination.

5. A bill discriminating apparatus that performs bill discrimination, comprising:

a storage unit that stores in advance a thickness reference value of an authentic note and a dimension reference value of an authentic note;

a thickness detection unit that detects the thickness of a bill that is subject to discrimination;

a dimension detection unit that detects the dimensions of the bill that is subject to discrimination; and a discrimination unit that decides that an adherence item is adhered to the bill, when there is an area that the detected thickness is greater than the thickness reference value and the detected thickness of the area is different from an integral multiple of the reference value and the detected dimensions are equal to the dimension reference value.

6. The bill discriminating apparatus in accordance with claim 5, further comprising:

a denomination detection unit that detects the denomination of the bill that is subject to discrimination, wherein:

the storage unit stores the reference value for each denomination, and the discrimination unit performs the discrimination using the reference value that corresponds to the detected denomination.

* * * * *